Feb. 6, 1934. M. SCHAUL 1,946,001
MACHINE FOR MAKING DOUGH FROM CEREALS OR THE LIKE
Filed July 27, 1932

Inventor:
MARTIN SCHAUL,
BY D. P. Wolhaupter
ATTORNEY

Patented Feb. 6, 1934

1,946,001

UNITED STATES PATENT OFFICE 1,946,001

MACHINE FOR MAKING DOUGH FROM CEREALS OR THE LIKE

Martin Schaul, Frankfort-on-the-Main, Germany, assignor to Novopan Studiengesellschaft Zur Herstellung besseren und billigeren Brotes m. b. H., Frankfort-on-the-Main, Germany, a firm Application July 27, 1932, Serial No. 625,138, and in Germany June 7, 1932

2 Claims. (Cl. 146—182)

The present invention relates to an improved machine for making dough immediately from cereals or grain.

It has heretofore been proposed to make dough from cereals which have not been ground previously, and various methods and apparatus have been suggested heretofore for the purpose. Especially an apparatus is known in the trade in which steeped and softened grains are supplied to a disintegrating device by means of two screw conveyors arranged side by side and adapted to run in opposite directions. The said conveyors thus serve exclusively the purpose of conveying the material to be treated.

According to the present invention the dough making machine comprises one or several groups of cutters mounted on a shaft supported in bearings of the casing of the machine, the single cutters of the group being arranged in spaced relationship so as to constitute, in their totality a body of screw-like or helical contour or appearance. As regards the helical shape of the cutters assembled to form a group, the same also serve the purpose of conveying the material to be treated. The machine, however, comprises also one or several combs or reeds rigidly secured in the casing of the machine and including each a plurality of blades adapted to co-operate with the said cutters for the purpose of disintegrating the grains of the material under treatment.

Preferably I provide on the shaft, in addition to the group or groups of cutters, a screw conveyor, of conventional type and a series of particular cutting devices including each a perforated disk and a cooperating many-armed or star-shaped cutter which in themselves are of a known type.

A machine constructed in general as above described affords an important advantage over the old machines hitherto used for similar purposes, inasmuch as the cereals conveyed through the machine will be disintegrated most thoroughly and comminuted to small dust-like particles which will be discharged from the machine in the form of an absolutely uniform meal or dough.

Another advantage inherent in or secured by the present invention resides in a marked economy of power for the reason that the disintegration of the grainy material is not effected exclusively by the cutting devices composed of cooperating perforated disks and star-shaped cutters or the like, and which are provided in close proximity to the discharging end of the machine.

Figure 1:
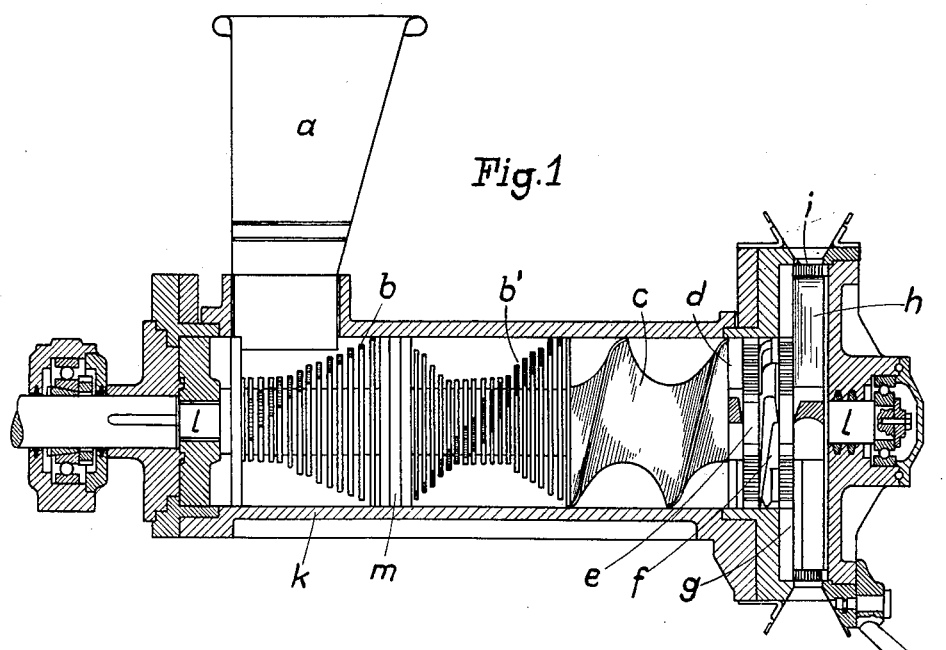
Figure 2:
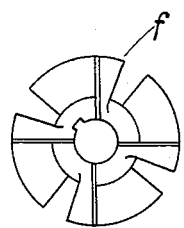
Figure 2A:
Figure 3:
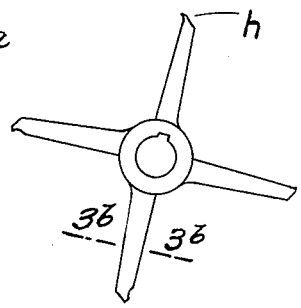
Figure 3A:
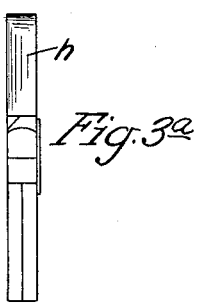

I will now proceed to describe my invention more in detail in connection with the embodiment thereof illustrated somewhat diagrammatically on the accompanying drawing in which Fig. 1 is a view in longitudinal vertical section of the machine constructed in accordance with the present invention;

Fig. 2 is a front view of one of the cutters of the particular cutting devices provided in the machine near the discharge and thereof;

Fig. 2$^a$ is a side view of the cutter illustrated in Fig. 2;

Fig. 3 is a front view of a star-shaped or four-armed cutter of a cutting device also provided in close vicinity of the discharge end of the machine;

Fig. 3$^a$ is a side view of the cutter illustrated in Fig. 3;

Fig. 3$^b$ is a cross section on the line 3$^b$—3$^b$ of Fig. 3; and

Figures 3B, 4:
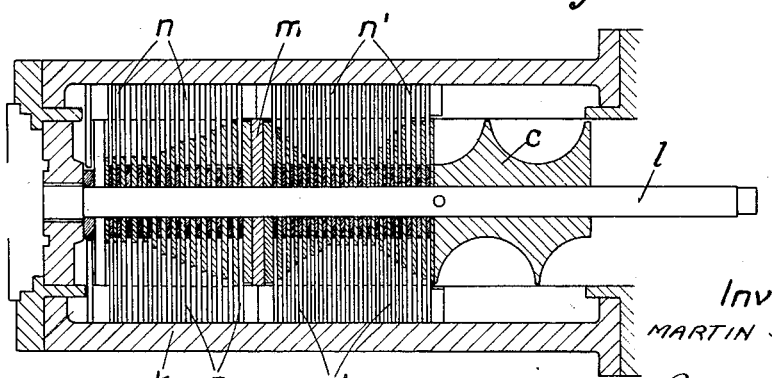

Fig. 4 is a view in longitudinal horizontal section of the machine with certain parts removed.

The material to be disintegrated such as soaked and softened rye, wheat and the like, is supplied through a feeding hopper $a$ to the rear compartment of the cylindrical casing $k$ of the machine, in order to be brought in contact with the group of parallel cutters $b$ provided in said compartment and keyed to a shaft $l$ journalled in suitable bearings in the two end walls of the casing. The individual cutters $b$ are spaced apart from each other a suitable distance, as required, and mounted or shaped to constitute, in their totality, what may be termed a helical body.

The cutters $b$ are arranged to cooperate with a reed or comb or a plurality of combs $n$, see Fig. 4, firmly secured in the casing $k$ and composed of blades engaging between the cutters $b$, that is to say, each individual blade $n$ is adjusted to project radially into the free space between two successive cutters, the blades and the cutters thus forming a kind of a wedge adapted to prevent the grainy material from receding so that the latter will be slowly conveyed in the casing towards the discharge end thereof and at the same time subjected to a coarse initial or preliminary disintegration.

In the embodiment shown the coarsely disintegrated material is forced through a perforated disk or so-called nozzle-disk $m$ forming the inner end wall of the compartment, in order to be forwarded through a second compartment wherein the shaft $l$ extending through the whole length of the casing, is equipped with a second group of cutters $b'$ arranged similarly to the described first group of cutters $b$. The material while passing through the disk $m$ undergoes further disintegration and is subsequently cut and comminuted once more in the second compartment by the cutters $b'$ cooperating with combs $n'$ provided in said second compartment and disposed in the same manner as described with reference to the combs or blades $n$. The coacting members $b'$ and $n'$ also act at the same time to force the comminuted materials towards and into a screw conveyor $c$ provided on the shaft $l$ in the casing.

Preferably the pitch of the helical lines in which the cutters $b'$ of the second group are arranged, is chosen to be inferior to that of the cutters $b$ of the first group and the pitch of the screw conveyor $c$ in turn is inferior to that of the second group of cutters $b'$ for obvious reasons.

Next to the screw conveyor $c$ a star-shaped cutter $d$ is keyed to the shaft $l$ to cooperate with a stationary perforated disk $e$ whereof the perforations or nozzle openings are of a smaller diameter than that of the perforations of the disk $m$. In some cases I find it advisable to provide on the shaft $l$ a further cutting member $f$ in the rear of and close by the disk $e$, as shown in Figure 1, associated with a similar stationary perforated disk $g$ for cooperation, whereof the perforations preferably are of a smaller diameter than that of the perforations of the preceding disk $e$.

As shown in Figure 1 a third cutting member in the form of a four-armed cutter $h$ may be provided on the shaft $l$ in the rear of and close by the disk $g$, if required or preferred. In the embodiment shown the cutter $h$ is adapted to revolve within a stationary cylindrical ring $i$ for cooperation with numerous, extremely fine perforations of the latter.

As will be seen in Figure 2 the cutting member $f$ is shaped to form four cutting arms whereof each is curved in accordance with a helical line. In this way the cutter is adapted to cut the material and at the same time feed or forward the same towards the discharge end of the casing.

From the foregoing it is believed that the advantages and novel features of my invention will be readily understood and, therefore, further detail description is deemed unnecessary.

My invention in its broadest aspect is not limited to the particular construction shown and described nor to any particular construction by which it has been or may be carried into effect, as many changes may be made therein without departing from the main principles of the invention and without sacrificing its chief advantages.

What I claim is:

1. A machine for making dough from grainy cereals comprising a casing, a shaft journalled in said casing, a plurality of groups of cutters keyed to said shaft in spaced relationship and shaped so as to constitute in their group totality, helical bodies, a corresponding plurality of combs or reeds composed of stationary parallel blades engaging in the interstices between the said cutters, a screw conveyor in the said casing in the rear of the last group of cutters, a star-shaped cutter and a cooperating stationary perforated disk at the outer end of said screw conveyor, the cutter being disposed between the disk and the outer end of the screw conveyor, and a second rotary cutter and a cooperating stationary perforated disk disposed outwardly of said first mentioned cutter and disk, said second mentioned cutter being disposed between said disks.

2. A machine for making dough from grainy cereals comprising a casing, a shaft journalled in said casing, a plurality of groups of cutters keyed to said shaft in spaced relationship and shaped so as to constitute, in their group totality, helical bodies, a corresponding purality of combs or reeds composed of stationary parallel blades engaging in the interstices between the said cutters, a screw conveyor in the said casing in the rear of the last group of cutters, a star-shaped cutter and a cooperating stationary perforated disk at the outer end of said screw conveyor, a second rotary cutter and a cooperating stationary perforated disk outwardly of said first mentioned cutter and disk, a stationary cylindrical ring outwardly of said second mentioned cutter and disk, said ring being provided with numerous radial perforations, and a third star-shaped cutter disposed within said ring for cooperation with the perforations thereof.

MARTIN SCHAUL.